(12) United States Patent
Chung et al.

(10) Patent No.: US 11,862,777 B2
(45) Date of Patent: Jan. 2, 2024

(54) BATTERY MODULE

(71) Applicant: SK Innovation Co., Ltd., Seoul (KR)

(72) Inventors: Gyu Jin Chung, Daejeon (KR); Ju Yong Park, Daejeon (KR); Sun Mo An, Daejeon (KR)

(73) Assignee: SK ON CO., LTD., Seoul (KR)

( * ) Notice: Subject to any disclaimer, the term of this patent is extended or adjusted under 35 U.S.C. 154(b) by 12 days.

(21) Appl. No.: 17/443,790

(22) Filed: Jul. 27, 2021

(65) Prior Publication Data

US 2021/0359357 A1 Nov. 18, 2021

Related U.S. Application Data

(63) Continuation of application No. 16/459,284, filed on Jul. 1, 2019, now Pat. No. 11,101,508.

(30) Foreign Application Priority Data

Jul. 2, 2018 (KR) .................. 10-2018-0076572

(51) Int. Cl.
*H01M 10/6555* (2014.01)
*H01M 10/647* (2014.01)
(Continued)

(52) U.S. Cl.
CPC ... *H01M 10/6555* (2015.04); *H01M 10/0413* (2013.01); *H01M 10/613* (2015.04);
(Continued)

(58) Field of Classification Search
CPC ......... H01M 10/6555; H01M 10/0413; H01M 10/613; H01M 10/625; H01M 10/647;
(Continued)

(56) References Cited

U.S. PATENT DOCUMENTS

2016/0197386 A1* 7/2016 Moon ................ H01M 50/293
429/120
2018/0269548 A1 9/2018 Chi et al.

FOREIGN PATENT DOCUMENTS

CN 108140916 A 6/2018
KR 10-2015-0025236 A 3/2015
(Continued)

OTHER PUBLICATIONS

Office Action (Notice of Refusal) for the Korean Patent Application No. 10-2022-0004806 issued by the Korean Intellectual Property Office dated Feb. 15, 2023.
Office Action for the Korean Patent Application No. 10-2023-0036573 issued by the Korean Intellectual Property Office dated May 1, 2023.
(Continued)

*Primary Examiner* — Daniel S Gatewood
(74) *Attorney, Agent, or Firm* — IP & T GROUP LLP

(57) ABSTRACT

A battery module includes: a plurality of battery cells stacked in a horizontal direction; a first plate supporting lower sides of the plurality of the battery cells and dissipating heat generated in the battery cells; and a second plate in contact with upper sides of the battery cells and dissipating heat generated in the battery cells, wherein the second plate comprises accommodation grooves to receive corresponding sealing portions formed in the upper sides of the battery cells, wherein a heat transfer material having a dielectric strength of from 10 kV/mm to 30 kV/mm is disposed in the accommodation grooves.

12 Claims, 7 Drawing Sheets

A

(51) Int. Cl.
*H01M 10/613* (2014.01)
*H01M 10/625* (2014.01)
*H01M 10/04* (2006.01)
*H01M 50/211* (2021.01)

(52) U.S. Cl.
CPC ....... *H01M 10/625* (2015.04); *H01M 10/647* (2015.04); *H01M 50/211* (2021.01)

(58) Field of Classification Search
CPC .. H01M 50/20; H01M 10/655; H01M 50/211; H01M 10/653; H01M 10/6554; Y02E 60/10; Y02P 70/50
See application file for complete search history.

(56) References Cited

FOREIGN PATENT DOCUMENTS

| | | |
|---|---|---|
| KR | 10-2016-0108960 A | 9/2016 |
| KR | 10-2016-0133776 A | 11/2016 |
| KR | 10-2016-0146587 A | 12/2016 |
| KR | 10-2017-0036639 A | 4/2017 |
| KR | 10-1773104 B1 | 8/2017 |
| KR | 10-1792751 B1 | 10/2017 |
| KR | 101792751 B1 * | 10/2017 |

OTHER PUBLICATIONS

Office Action for the Chinese Patent Application No. 201910587338.4 issued by the Chinese Patent Office dated Jun. 29, 1 2023.

* cited by examiner

BATTERY MODULE

CROSS-REFERENCE TO RELATED APPLICATION(S)

This application is a continuation of U.S. patent application Ser. No. 16/459,284 filed on Jul. 1, 2019, which claims benefit of priority to Korean Patent Application No. 10-2018-0076572 filed on Jul. 2, 2018 in the Korean Intellectual Property Office, the disclosure of which is incorporated herein by reference in its entirety.

BACKGROUND

1. Field

The present disclosure relates to a battery module.

2. Description of Related Art

Unlike primary batteries, secondary batteries are rechargeable and are thus applicable to devices within various fields, such as digital cameras, cellular phones, laptop computers, or hybrid vehicles. Examples of secondary batteries include nickel-cadmium batteries, nickel-metal hydride batteries, nickel-hydrogen batteries, and lithium batteries.

Among such secondary batteries, much research has been conducted into lithium secondary batteries having high energy density and discharge voltages. Recent lithium secondary batteries have been manufactured in the form of flexible pouch-type battery cells, and modules each including a plurality of such pouch-type battery cells connected to each other are used.

Meanwhile, if such a battery module is used for an extended period of time, heat is generated by batteries, and particularly, when such a battery module is charged, the internal temperature of batteries rapidly increases, resulting in a decrease in lifespan and efficiency, and fires or explosions in the worst case scenario.

Therefore, cooling systems are required to cool battery cells included in battery modules. In the related art, however, heat generated in battery cells is not effectively dissipated, and thus low-cooling-efficiency problems are caused.

SUMMARY

An aspect of the present disclosure may provide a battery module having a cooling device for effectively dissipating heat generated in battery cells.

According to an aspect of the present disclosure, a battery module may include: a plurality of battery cells; a first plate supporting lower sides of the battery cells and dissipating heat generated in the battery cells; and a second plate being in contact with upper sides of the battery cells and dissipating heat generated in the battery cells, wherein the second plate may include accommodation grooves to receive sealing portions of the battery cells, and a heat transfer material may be disposed in the accommodation grooves.

The first plate may include insertion grooves to receive sealing portions protruding downward from the battery cells.

The accommodation grooves may be wider and deeper than the insertion grooves.

Each of the battery cells may include: an accommodation portion having a rectangular shape and accommodating an electrode assembly; and the sealing portions arranged along an outer periphery of the accommodation portion, wherein the sealing portions may only be formed on three sides of the accommodation portion.

The sealing portions received in the accommodation grooves may be folded at least once.

The first plate and the second plate may be formed of an aluminum (Al) material.

The heat transfer material may have dielectric strength within a range of 10 KV/mm to 30 KV/mm.

The battery module may further include a cooling device coupled to at least one of an upper side of the first plate and a lower side of the second plate.

According to another aspect of the present disclosure, a battery module may include: a plurality of battery cells; a first plate supporting lower surfaces of the battery cells and dissipating heat generated in the battery cells; and a second plate being in contact with upper sides of the battery cells and dissipating heat generated in the battery cells, wherein the second plate may include accommodation grooves to receive second sealing portions protruding upwardly from the battery cells, and the first plate may include insertion grooves to receive first sealing portions protruding downward from the battery cells.

The accommodation grooves may be wider and deeper than the insertion grooves.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
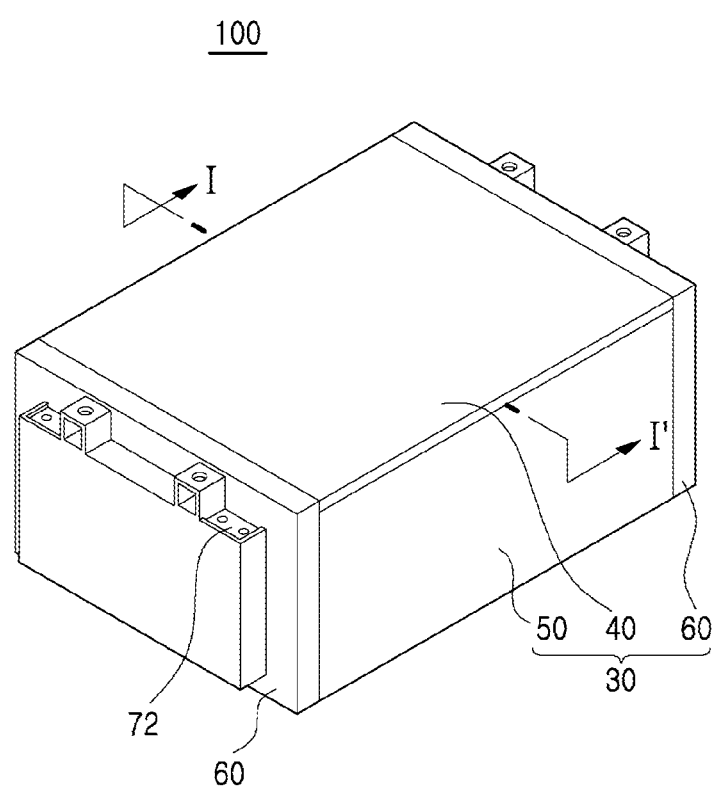
FIG. 1 is a perspective view schematically illustrating a battery module according to an embodiment of the present disclosure.

Prior to the description, it should be understood that the terms used in the specification and the appended claims should not be construed as limited to general and dictionary meanings, but should be interpreted based on the meanings and concepts corresponding to technical aspects of the present disclosure on the basis of the principle that the inventor is allowed to define terms appropriately for the best explanation. Therefore, the configurations described in the following description with reference the accompanying drawings do not represent all technical concepts or ideas of the present disclosure but should be considered to be exemplary embodiments of the present disclosure. It should be understood that various modifications and equivalents of the embodiments may be devised within the scope of the present invention at the time of the filing of the application.

Hereinafter, exemplary embodiments of the present disclosure will be described in detail with reference to the accompanying drawings. In the drawings, the same elements are denoted by the same reference numerals as much as possible. Furthermore, detailed descriptions related to well-known functions or configurations may be omitted in order not to unnecessarily obscure subject matters of the present disclosure. For the same reason, some of the elements in the accompanying drawings are exaggerated, omitted, or shown schematically, and the size of each element may not entirely reflect the actual size.

Figure 2:
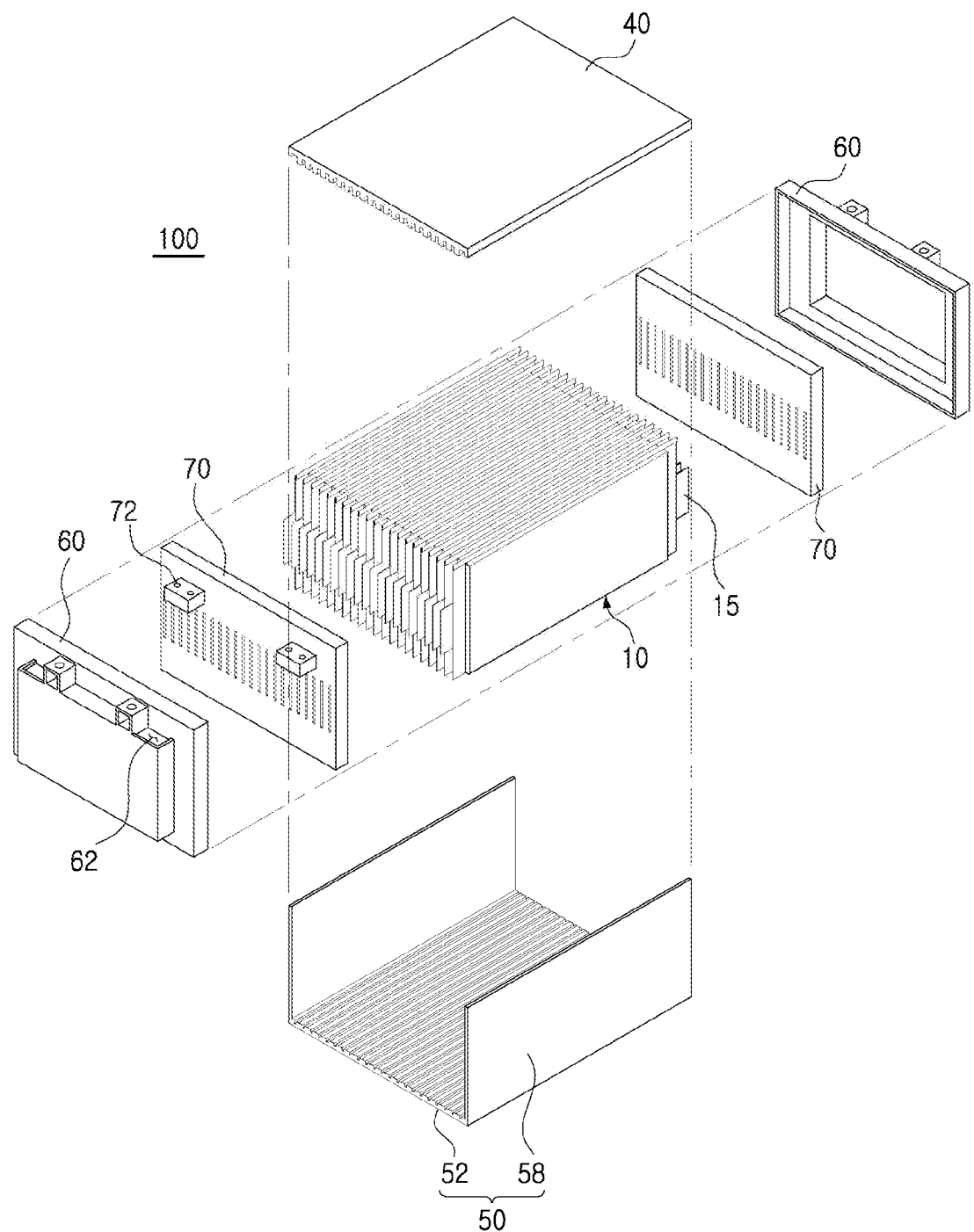
FIG. 2 is an exploded perspective view illustrating the battery module shown in FIG. 1.
Figure 3:
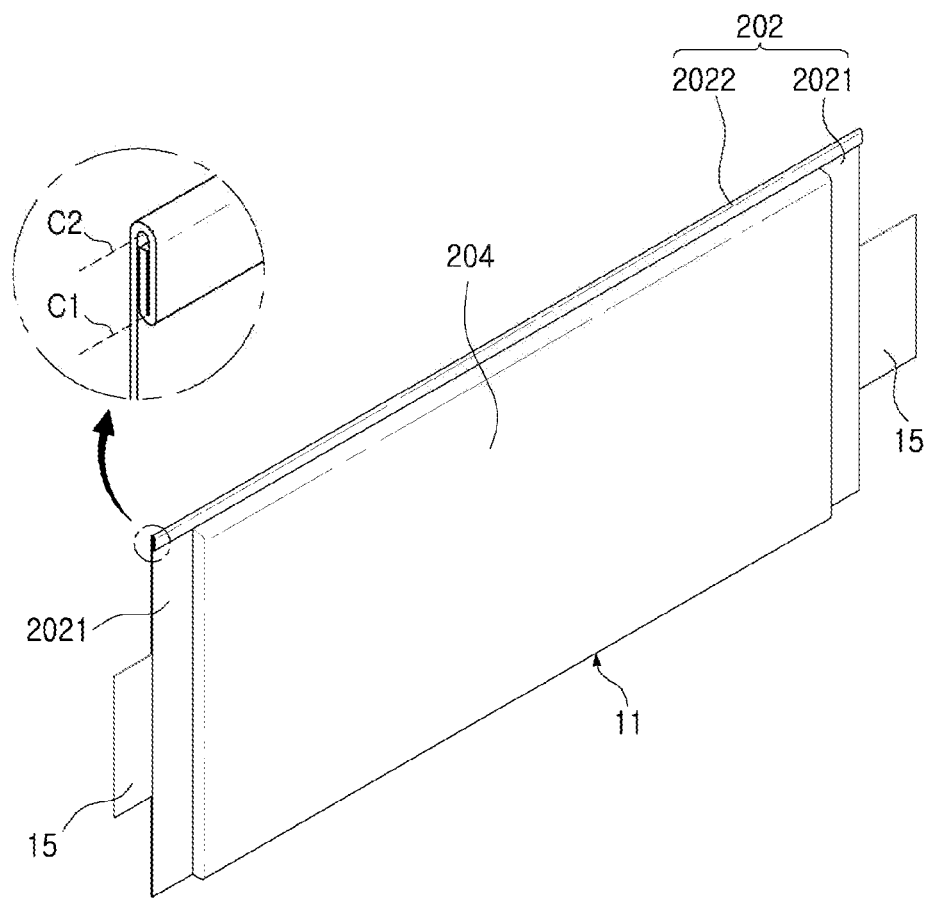
FIG. 3 is an enlarged perspective view illustrating a battery cell shown in FIG. 2.
Figure 4:
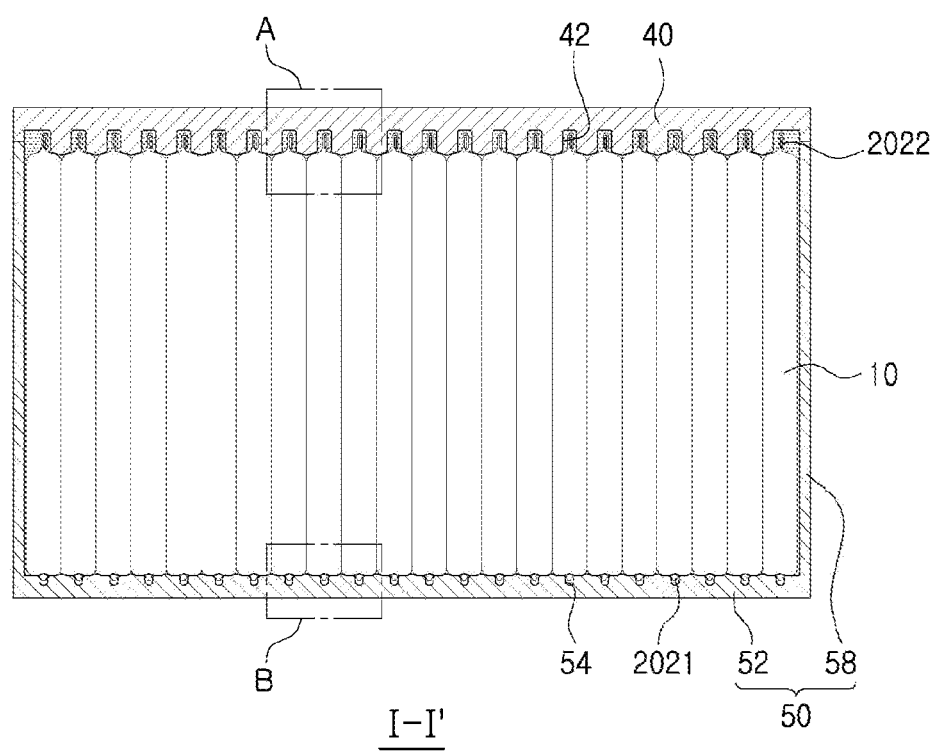
FIG. 4 is a cross-sectional view taken along line I-I' of FIG. 1.
Figure 5:
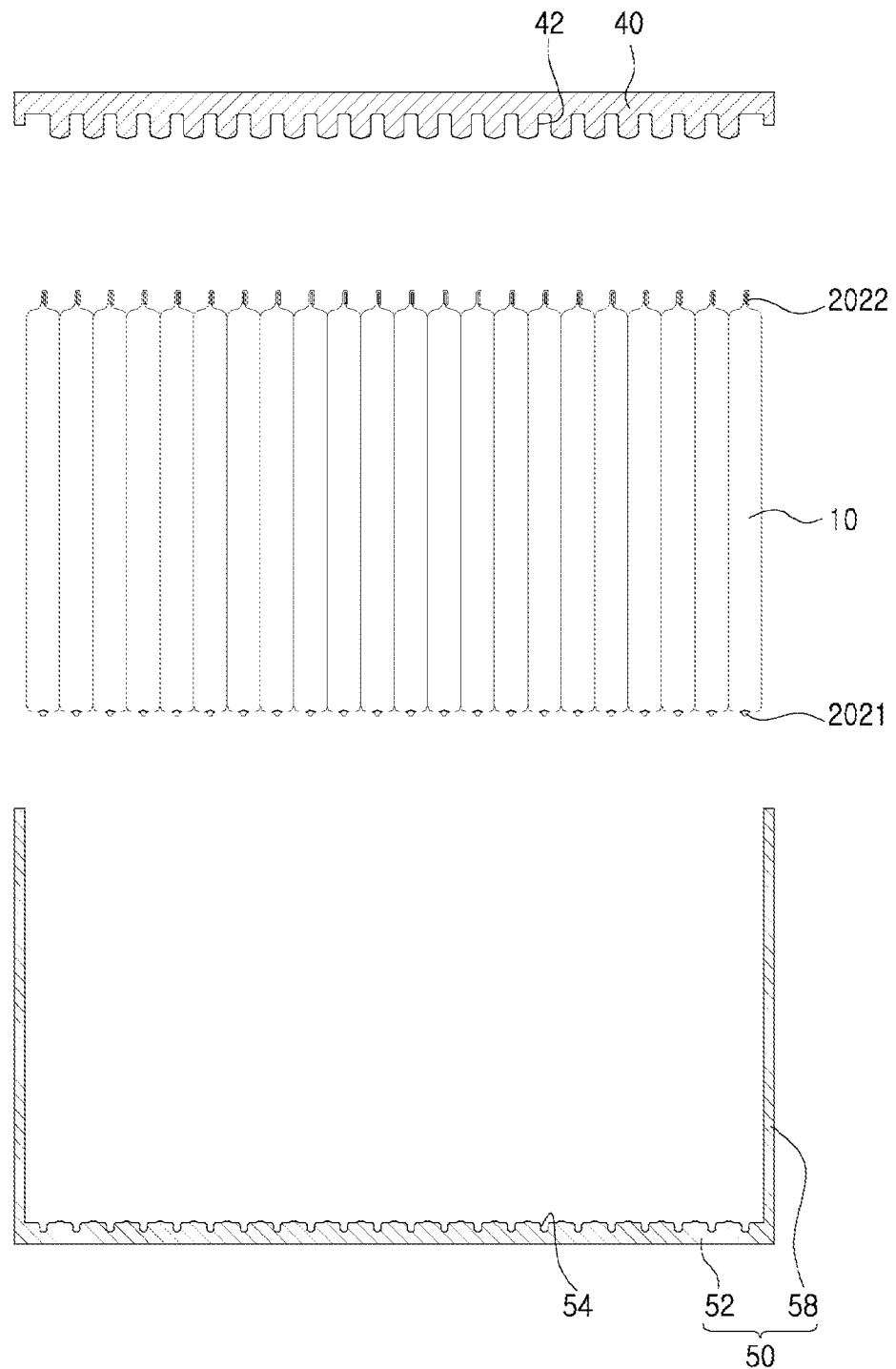
FIG. 5 is an exploded view of FIG. 4.
Figure 6A:
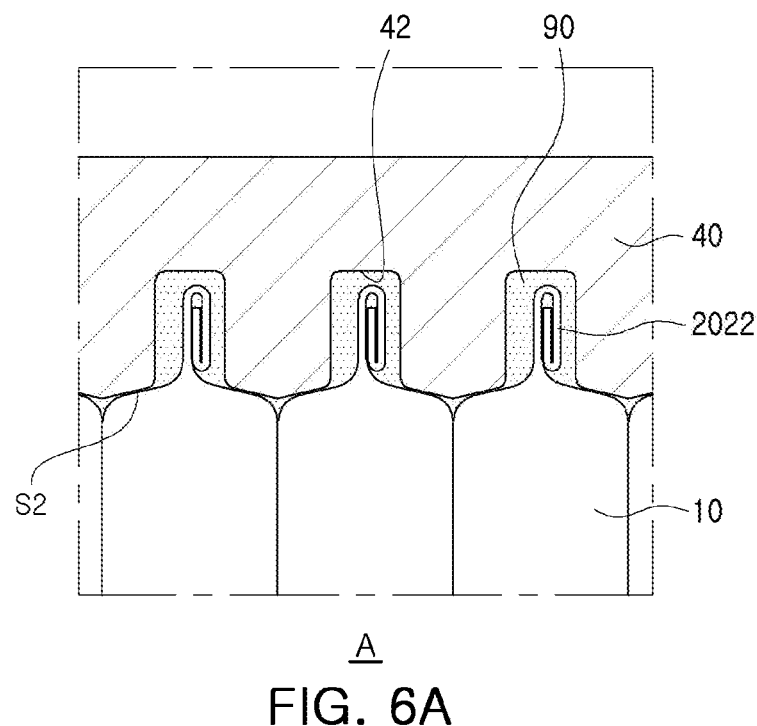
FIGS. 6A and 6B are enlarged views illustrating a portion A and a portion B of FIG. 4.
Figure 6B:
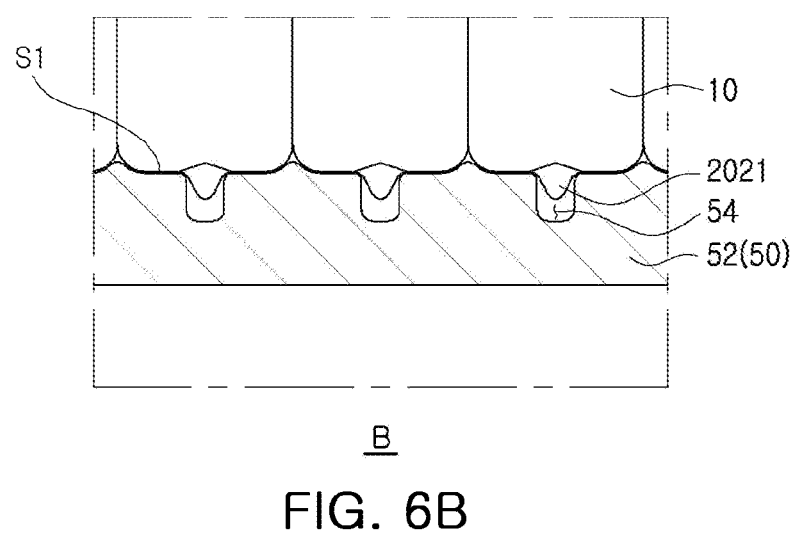

FIG. 1 is a perspective view schematically illustrating a battery module 100 according to an embodiment of the present disclosure, FIG. 2 is an exploded perspective view illustrating the battery module 100 shown in FIG. 1, and FIG. 3 is an enlarged perspective view illustrating a battery cell 10 shown in FIG. 2. In addition, FIG. 4 is a cross-sectional view taken along line I-I' of FIG. 1, FIG. 5 is an exploded view of FIG. 4, and FIGS. 6A and 6B are enlarged views illustrating a portion A and a portion B of FIG. 4.

Referring to FIGS. 1 to 6, the battery module 100 of the present embodiment may have an approximately hexahedral shape and may include a plurality of battery cells 10, circuit units 70 configured to electrically connect the battery cells 10, and a case 30 configured to protect the battery cells 10 from external environments.

The battery cells 10 may be arranged side by side in a layered manner, and electrode leads 15 may protrude outwardly from bodies of the battery cells 10. The battery cells 10 may be, for example, pouch-type secondary batteries.

Each of the battery cells 10 may be formed by placing an electrode assembly (not shown) in a pouch 11.

The electrode assembly includes a plurality of electrode plates and a plurality of electrode tabs and is accommodated in the pouch 11. Here, the electrode plates may include a positive electrode plate and a negative electrode plate, and the electrode assembly may be formed by stacking the positive and negative electrode plates with a separator being therebetween and wide surfaces of the positive and negative electrode plates facing each other.

Each of the positive and negative electrode plates may be formed by applying an active material slurry to a current collector, and in general, the active material slurry may be prepared by stirring materials such as a granular active material, an auxiliary conductor, a binder, and a plasticizer in a solvent.

In addition, the electrode assembly may be formed by vertically stacking a plurality of positive electrode plates and a plurality of negative electrode plates. In this case, the positive electrode plates and the negative electrode plates may respectively include electrode tabs, and electrode tabs of the same polarity may be brought into contact with each other and connected to the same electrode lead 15 (refer to FIG. 3).

In the present embodiment, two electrode leads 15 are arranged to face opposite directions.

The pouch 11 is formed in a container shape and provides an internal space in which the electrode assembly and an electrolyte (not shown) are accommodated. In this case, portions of the electrode leads 15 of the electrode assembly are exposed to the outside of the pouch 11.

The pouch 11 may be divided into sealing portions 202 and an accommodation portion 204.

The accommodation portion 204 is formed in a container shape to provide a rectangular internal space. The electrode assembly and the electrolyte are accommodated in the inner space of the accommodation portion 204.

The sealing portions 202 are formed in a flange shape extending outwardly from the accommodation portion 204 formed in a container shape. Therefore, the sealing portions 202 are arranged in a rim shape along the outer periphery of the accommodation portion 204.

The sealing portions 202 may be joined by a thermal fusing method. However, the sealing portions 202 are not limited thereto.

Furthermore, in the present embodiment, the sealing portions 202 may include first sealing portions 2021 on which the electrode leads 15 are arranged, and a second sealing portion 2022 on which the electrode leads 15 are not arranged.

In the present embodiment, the pouch 11 is manufactured using a sheet of casing material through a forming process. That is, the pouch 11 is manufactured by forming two receiving portions on the casing material through a forming process, and then the casing material is folded such that the two receiving portions may form a single space.

In the present embodiment, the accommodation portion 204 has a rectangular shape. However, since it is not required to form a sealing portion on a lower side S1 of the battery cell 10, the sealing portions 202 are formed around the accommodation portion 204 only on three sides of the accommodation portion 204.

In the present embodiment, the electrode leads 15 are arranged to face opposite directions. That is, two electrode leads 15 are arranged on sealing portions 202 formed on different sides. Therefore, the sealing portions 202 provided on three sides of the accommodation portion 204 include: two first sealing portions 2021 on which the electrode leads 15 are arranged; and a single second sealing portion 2022 on which the electrode leads 15 are not arranged.

Furthermore, in the battery cell 10 of the present embodiment, the sealing portions 202 are folded at least once so as to increase joining reliability of the sealing portions 202 and minimize the areas of the sealing portions 202.

More specifically, in the present embodiment, the second sealing portion 2022 of the sealing portions 202 on which the electrode leads 15 are not arranged is folded twice and is then fixed.

For example, the second sealing portion 2022 may be folded by 180 degrees along a first folding line C1 shown in FIG. 3, and may then be folded by 180 degrees along a second folding line C2 shown in FIG. 3.

The battery cells 10 configured as described above may be rechargeable nickel metal hydride (Ni-MH) batteries or rechargeable lithium ion (Li-ion) batteries capable of generating current. In addition, the battery cells 10 are vertically stood in the case 30 (described later) and stacked in a left-right direction or a horizontal direction. Referring to FIGS. 6A and 6B, each of battery cells has a lower side S1 secured to the lower plate 52 of the first plate 50, an upper side S2, opposite said lower side S1, in contact with the second plate 40, and opposite lateral sides in the first direction, the stacking direction of the battery cells.

Although not shown, at least one buffer pad may be placed between the battery cells 10 arranged in a stack. The buffer pad may be provided to prevent an increase in the total volume of the battery cells 10 when a particular battery cell 10 swells. The buffer pad may be formed of polyurethane foam, but is not limited thereto.

The case 30 defines the outer shape of the battery module 100 and is arranged outside the battery cells 10 to protect the battery cells 10 from external environments. In the present embodiment, along therewith, the case 30 also functions as a cooling member of the battery module 100.

The case 30 of the present embodiment includes a first plate 50 coupled to lower portions of the battery cells 10, a second plate 40 coupled to upper portions of the battery cells 10, and covers 60 coupled to sides of the battery cells 10 on which the electrode leads 15 of the battery cells 10 are arranged. Among the first plate, the second plate 40, and the covers 60, the first plate 50 and the second plate 40 function as cooling members of the battery module 100.

The first plate 50 may include: a lower plate 52 placed on the lower portions of the battery cells 10 and supporting the lower sides S1 of the battery cells 10; and side plates 58 supporting sides of the battery cells 10 on which the accommodation portions 204 of the battery cells 10 are located. However, in some cases, the side plates 58 and the lower plate 52 may be provided as separate elements.

Portions of a seating surface of the lower plate 52 on which the battery cells 10 are placed in contact with the lower plate 52 may be curved such that the lower side S1 of the battery cells 10 may be more securely supported.

Accordingly, the lower side S1 of the battery cells 10 may be in contact with the lower plate 52 with a large contact area, and thus heat transfer to the lower plate 52 may effectively occur.

In the present embodiment, the pouches 11 of each of the battery cells 10 is formed by folding a sheet of the casing material, and thus lower end portions of the first sealing portions 2021 (refer to FIG. 6B) may protrude downward from the accommodation portion 204 of each of the battery cells 10. Thus, insertion grooves 54 are formed in the seating surface of the lower plate 52 to receive the first sealing portions 2021.

The insertion grooves 54 have a width and depth for the first sealing portions 2021 to be easily inserted into the insertion grooves 54.

The side plates 58 extend from both sides of the lower plate 52 and are arranged along sides of the battery cells 10 stacked in the left-right direction such that the accommodation portions 204 of the battery cells 10 may be supported by the side plates 58.

The side plates 58 may be in contact with the accommodation portions 204 of the battery cells 10 to securely support the battery cells 10. However, this is a non-limiting example. That is, various modifications may be made, and for example, members such as heat-dissipating pads or buffer members may be placed between the side plates 58 and the accommodation portions 204.

The first plate 50 configured as described above is formed of a material having high thermal conductivity such as a metal. For example, the first plate 50 may be formed of an aluminum material. However, this is a non-limiting example. That is, the first plate 50 may be formed of any other material having strength and thermal conductivity similar to those of a metal.

The second plate 40 is arranged on the upper portions of the battery cells 10 and is coupled to the upper sides s2 of the battery cells 10. In addition, the second plate 40 is fastened to upper ends of the side plates 58 of the first plate 50. Therefore, after the second plate 40 is fastened to the first plate 50, the second plate 40 and the first plate 50 have the shape of a tubular member having a hollow interior.

Portions of a lower side of the second plate 40 which make contact with the battery cells 10 may be curved such that the contact between the second plate 40 and the battery cells 10 may be securely maintained. Therefore, the upper sides s2 of the battery cells 10 may be in contact with the second plate 40 with a large contact area, and thus heat may be effectively dissipated.

In addition, since the battery cells 10 are vertically stood and stacked in the left-right direction, the second sealing portions 2022 are located on the upper sides s2 of the battery cells 10. Therefore, the accommodation grooves 42 are formed in the lower side of the second plate 40 to accommodate the second sealing portions 2022.

The accommodation grooves 42 have a width and depth for the second sealing portions 2022 to be easily inserted into the accommodation grooves 42. Since the second sealing portions 2022 are folded at least once, the accommodation grooves 42 have a width and depth greater than those of the insertion grooves 54.

Furthermore, in the accommodation grooves 42, the second sealing portions 2022 are spaced apart from the second plate 40. In this case, the second sealing portions 2022 may be shaken in the accommodation grooves 42, or heat released from the second sealing portions 2022 may not easily transfer to the second plate 40.

Therefore, in the present embodiment, a heat transfer material 90 is disposed in the accommodation grooves 42. The heat transfer material 90 may be prepared based on a silicon material or an epoxy material, but is not limited thereto.

The heat transfer material 90 may be filled in the accommodation grooves 42 in a liquid or gel state and may then be cured. Then, the second sealing portions 2022 may be firmly fixed in the accommodation grooves 42, and heat released through the second sealing portions 2022 may rapidly transfer to the second plate 40 through the heat transfer material 90.

In addition, the heat transfer material 90 of the present embodiment may be highly insulative and may have dielectric strength, for example, within the range of 10 KV/mm to 30 KV/mm.

Therefore, in the battery module 100 of the present embodiment, even if the second sealing portions 2022 arranged in the accommodation grooves 42 partially undergo a dielectric breakdown, electrical insulation between the second sealing portions 2022 and the second plate 40 may be maintained owing to the heat transfer material 90 provided around the second sealing portions 2022.

Furthermore, in the present embodiment, the casein the heat transfer material 90 is filled only in the accommodation grooves 42 is described as an example. However, the present disclosure is not limited thereto, and in some cases, the heat transfer material 90 may be filled in the insertion grooves 54.

Like the first plate 50, the second plate 40 is formed of a material having high thermal conductivity such as a metal. The second plate 40 may be formed of an aluminum material. However, this is a non-limiting example. That is, the second plate 40 may be formed of any other material having strength and thermal conductivity similar to those of a metal.

The first plate 50 and the second plate 40 may be joined together by a method such as welding. However, this is a non-limiting example, and the first plate 50 and the second plate 40 may be joined together by various other methods such as a sliding coupling method or a method of using fixing members such as bolts or screws.

The covers 60 are coupled to sides of the battery cells 10 on which the electrode leads 15 are arranged.

The covers 60 are coupled to the first plate 50 and the second plate 40 to complete the outer shape of the battery module 100 together with the first plate 50 and the second plate 40.

The covers 60 may be formed of an insulative material such as a resin and may include through-holes 62 to expose connection terminals 72 of the circuit units 70 as described later.

The covers 60 may be coupled to the first plate 50 and the second plate 40 using fixing members such as screws or bolts. However, this is a non-limiting example.

The circuit units 70 may be placed between the covers 60 and the battery cells 10.

The circuit units 70 are connected to the electrode leads 15 of the battery cells 10 and include the connection terminals 72 for connection with an external device. Therefore, the battery cells 10 may be electrically connected to an external device through the circuit units 70.

The connection terminals 72 of the circuit units 70 are exposed to the outside through the through-holes 62 formed in the covers 60. Therefore, the through-holes 62 of the covers 60 are sized according to the size and shape of the connection terminals 72.

Each of the circuit units 70 may include a circuit board (for example, a printed circuit board (PCB)) and a plurality of electronic devices (not shown) mounted on the circuit board, and may have a function of sensing the voltage of the battery cells 10.

In the battery module 100 of the present embodiment, the first plate 50 and the second plate 40 arranged on the upper sides S2 and lower side S1 of the battery cells 10 are in contact with the battery cells 10 with a large area. Therefore, heat generated in the battery cells 10 may be dissipated through the upper sides S2 and lower sides S1 of the battery cells 10. In addition, since the heat transfer material 90 is placed in a space between the second sealing portions 2022 and the second plate 40, heat dissipation may occur more effective than in the related art.

In addition, since the second sealing portions 2022 are fixed by the heat transfer material 90, upper end portions of the battery cells 10 may be securely fixed to the second plate 40, and thus the battery cells 10 may not be shaken due to external vibrations or impacts.

The present disclosure is not limited to the above-described embodiments, and various modifications may be made in the embodiments.

Figure 7:
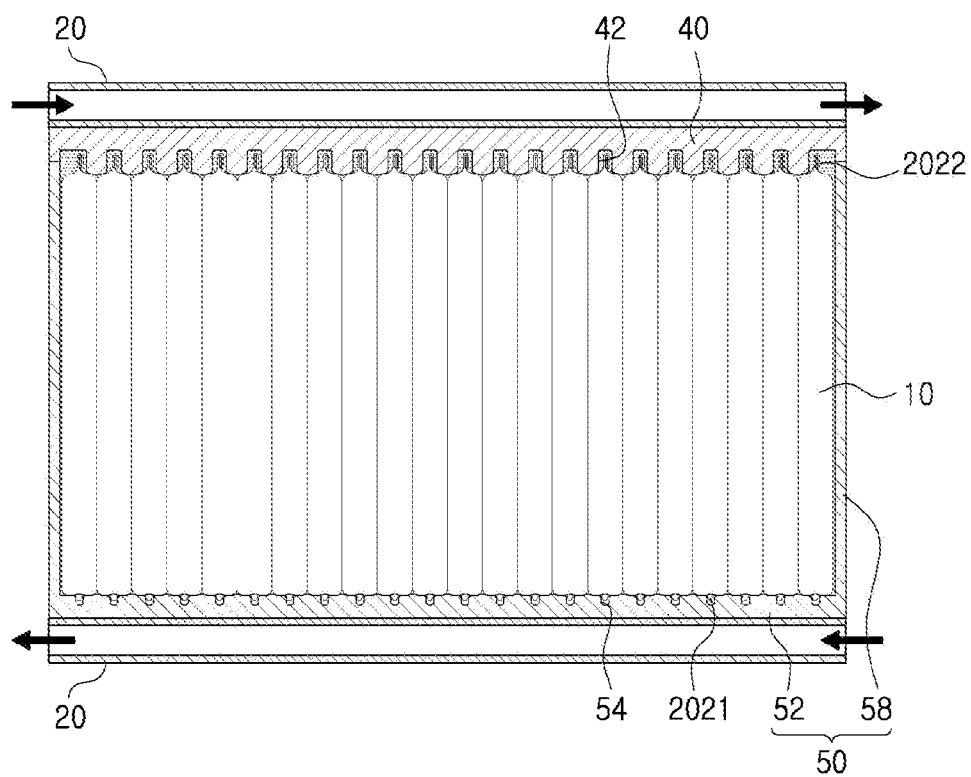
FIG. 7 is a cross-sectional view schematically illustrating a battery module according to another embodiment of the present disclosure.

FIG. 7 is a cross-sectional view schematically illustrating a battery module according to another embodiment of the present disclosure.

Referring to FIG. 7, the battery module of the present embodiment includes the battery module of the previous embodiment, and a cooling device 20 is coupled to the lower side of the first plate 50 and the upper side of the second plate 40.

In the present embodiment, a water-cooling-type cooling device may be used as the cooling devices 20. In FIG. 7, cooling plates of the water-cooling-type cooling device which include cooling pipes or cooling passages are partially shown as the cooling device 20. However, the present disclosure is not limited thereto. For example, an air-cooling-type cooling device may be used.

When the cooling device 20 is provided on an outer side of the case 30 as described above, cooling efficiency may be further increased.

Although not shown, a thermal pad may be arranged between the cooling device 20 and the first plate 50 or the second plate 40 for effective heat transfer.

While exemplary embodiments have been shown and described above, the scope of the present invention is not limited thereto, and it will be apparent to those skilled in the art that modifications and variations could be made without departing from the scope of the present invention as defined by the appended claims.

For example, although each of the battery cells 10 includes three sealing portions 202 in the above-described embodiments, each of the battery cells 10 may include four sealing portions in other embodiments. In this case, the insertion grooves 54 may have a size equal to or similar to the size of the accommodation grooves 42, and the heat transfer material 90 may also be placed in the insertion grooves 54.

In addition, although the first plate 50 and the second plate 40 are used as the case 30 of the battery module 100 in the above-described embodiments, the first plate 50 and second plate 40 may be used only as cooling members, and an additional case may be provided outside the first plate 50 and the second plate. That is, various modifications may be made.

According to the embodiments of the present disclosure, heat generated in the battery cells 10 of the battery module 100 may be dissipated through the upper sides S2 and lower sides S1 of the battery cells 10, and owing to the heat transfer material 90 placed between the sealing portions 202 and the case 30, heat may be dissipated more effectively than in the related.

In addition, since the heat transfer material 90 fixes the sealing portions 202, the battery cells 10 may be securely fixed to the case 30 without being shaken by external vibrations or impacts.

What is claimed is:

1. A battery module comprising:
a plurality of battery cells stacked in a horizontal direction, wherein each of the plurality battery cells includes an upper side divided into two regions by a sealing portion formed in the upper side of the battery cell;
a first plate supporting lower sides of the plurality of the battery cells and dissipating heat generated in the battery cells; and
a second plate in contact with upper sides of the battery cells and dissipating heat generated in the battery cells,
wherein the second plate comprises accommodation grooves to receive corresponding the sealing portions,
wherein at least one of the plurality of battery cells is in contact with the second plate in both of the two regions of the upper side, and
wherein a heat transfer material having a dielectric strength of from 10 kV/mm to 30 kV/mm is disposed in the accommodation grooves.

2. The battery module of claim 1, wherein the first plate comprises insertion grooves to receive corresponding sealing portions protruding downward from the battery cells.

3. The battery module of claim 2, wherein the accommodation grooves are wider and deeper than the insertion grooves.

4. The battery module of claim 1, wherein each of the battery cells comprises:
an accommodation portion having a rectangular shape for accommodating an electrode assembly; and
the sealing portions arranged along an outer periphery of the accommodation portion,
wherein the sealing portions are only formed on three sides of the accommodation portion.

5. The battery module of claim 4, wherein the sealing portions received in the accommodation grooves are folded at least once.

6. The battery module of claim 1, wherein the first plate and the second plate are formed of an aluminum (Al) material.

7. The battery module of claim 1, further comprising a cooling device coupled to a lower side of the first plate or an upper side of the second plate.

8. The battery module of claim 1, wherein the plurality of battery cells include a pouch-type secondary battery.

9. The battery module of claim 1, wherein the heat transfer material includes a silicon material or an epoxy material.

10. A battery module comprising:
a plurality of battery cells stacked adjacent to each other in a first direction, wherein each of plurality the battery cells includes an upper side divided into two regions by a sealing portion formed in the upper side of the battery cell;
a first plate supporting a lower side of each of the plurality of the battery cells, and contacting the lower side of each of the plurality of the battery cells for dissipating heat generated in the battery cells; and
a second plate comprising accommodation grooves to receive corresponding the sealing portions,
wherein at least one of the plurality of battery cells is in contact with the second plate in both of the two regions of the upper side, and
wherein a heat transfer material is disposed in the accommodation grooves.

11. The battery module of claim 10,
wherein the first direction is a horizontal direction.

12. The battery module of claim 10, wherein the first plate comprises insertion grooves to receive corresponding sealing portions protruding downward from the plurality of the battery cells, and
wherein the accommodation grooves are wider and deeper than the insertion grooves.

\* \* \* \* \*